United States Patent [19]
Jensen et al.

[11] 3,916,338
[45] *Oct. 28, 1975

[54] METAL ATOM OXIDATION LASER
[75] Inventors: Reed J. Jensen; Walter W. Rice; Willard H. Beattie, all of Los Alamos, N. Mex.
[73] Assignee: The United States of America as represented by the United States Energy Research and Development Administration, Washington, D.C.
[ * ] Notice: The portion of the term of this patent subsequent to Aug. 13, 1991, has been disclaimed.
[22] Filed: May 13, 1974
[21] Appl. No.: 469,737

Related U.S. Application Data
[63] Continuation-in-part of Ser. No. 304,578, Nov. 7, 1972.

[52] U.S. Cl.......... 331/94.5 G; 331/94.5 P; 330/4.3
[51] Int. Cl.²...................... H01S 3/22; H01S 3/095

[58] Field of Search................... 331/94.5; 330/4.3

[56] References Cited
UNITED STATES PATENTS
3,701,045   10/1972   Bronfin et al.............. 331/94.5 G
3,829,793   8/1974   Jensen et al................ 331/94.5 P

*Primary Examiner*—Robert J. Webster
*Attorney, Agent, or Firm*—Dean E. Carlson; Edward C. Walterscheid

[57] ABSTRACT

A chemical laser which operates by formation of metal or carbon atoms and reaction of such atoms with a gaseous oxidizer in an optical resonant cavity. The lasing species are diatomic or polyatomic in nature and are readily produced by exchange or other abstraction reactions between the metal or carbon atoms and the oxidizer. The lasing molecules may be metal or carbon monohalides or monoxides.

17 Claims, 9 Drawing Figures

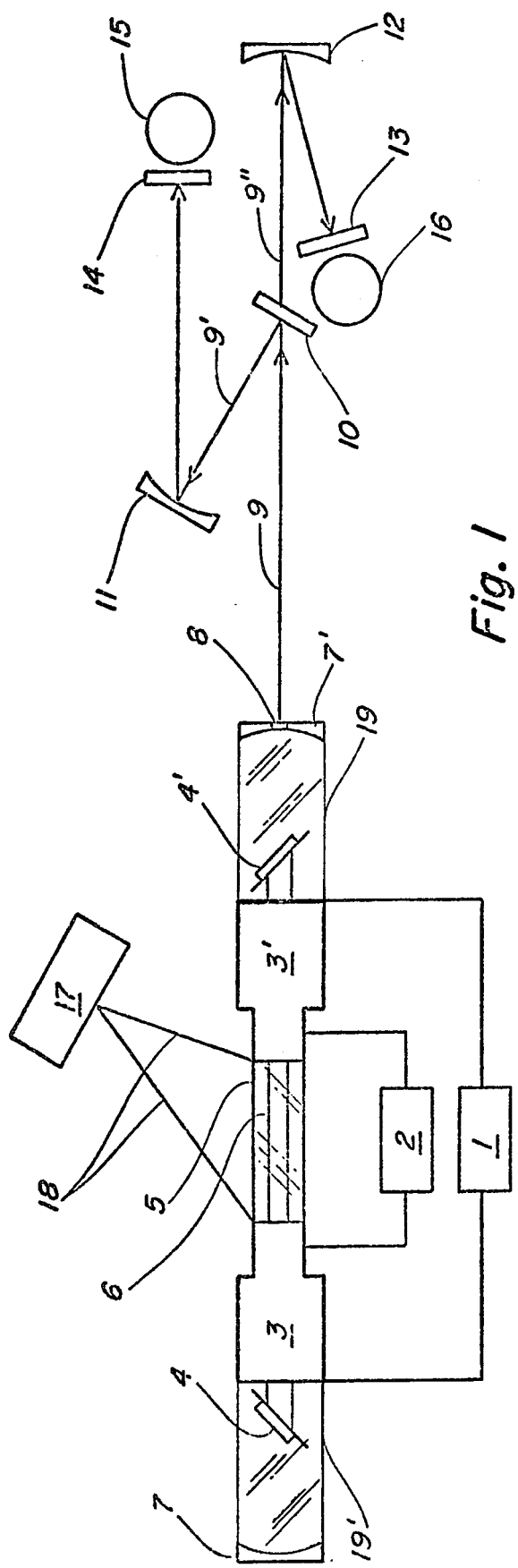
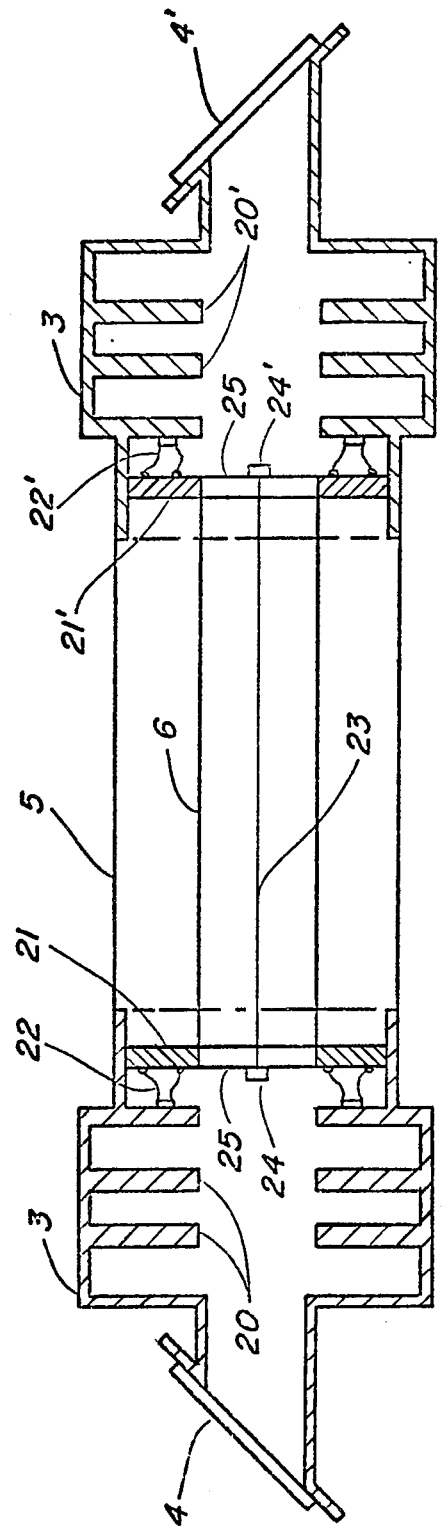
Fig. 1
Fig. 2

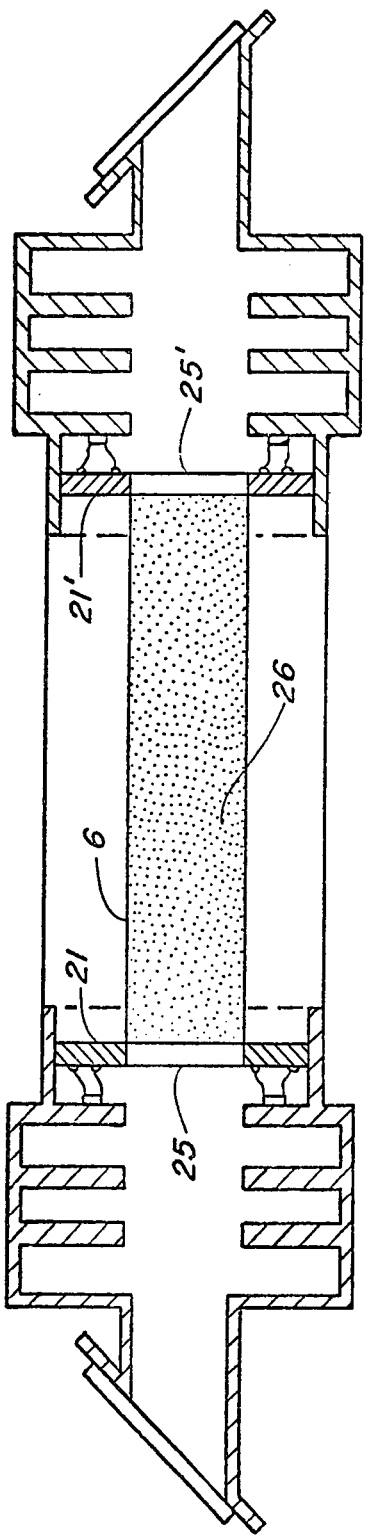
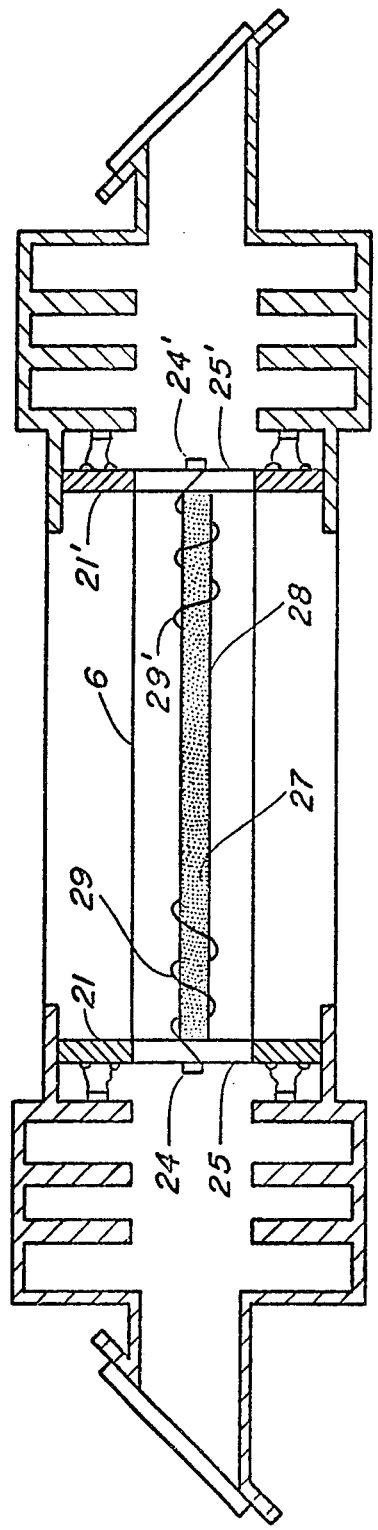

3,916,338

METAL ATOM OXIDATION LASER

REFERENCE TO RELATED APPLICATIONS

This application is a continuation-in-part of application Ser. No. 304,578, also entitled "Metal Atom Oxidation Laser," and filed Nov. 7, 1972.

BACKGROUND OF THE INVENTION

The invention described herein was made in the course of, or under, a contract with the U.S. ATOMIC ENERGY COMMISSION. It relates to chemical lasers and more particularly to a chemical laser in which atoms of metal or carbon react with a gaseous oxidizer to produce a lasing species.

A chemical laser may be defined as a device in which the conversion of the internal energy change of a chemical reaction into specific excitation of a product species leads to critical population inversion and laser action. An external energy source may be—and indeed most frequently is—used to initiate the chemical reaction. The critical feature of a chemical laser is that the lasing action depends on the making and breaking of chemical bonds. The specific excitation produced may take the form of rotational, vibrational, or electronic excitation.

The great majority of chemical lasers known in the art depend on the production of a vibrational-rotational population inversion. The population inversion is typically produced by exchange reactions of the type $$A + BC \rightarrow AB^* + C$$

where A, B, and C are atoms. For the lasing reaction to proceed most effectively and efficiently it is necessary that large quantities of atomic species A be produced within, or introduced into, the reaction vessel in a very short time. Some form of energy input is necessary to produce large quantities of the atomic species A. It is known in the art that this input energy may be provided by means of light energy, electrical energy, chemical energy, or a combination of these. See, e.g., U.S. Pat. No. 3,662,280 for "Explosively Driven Pulsed Chemical Laser" issued to two of the present inventors, Jensen and Rice, on May 9, 1972.

Vibrationally excited diatomic or polyatomic species may also be readily prepared by abstraction reactions of the type $$A + BC_x \rightarrow AC^* + BC_{(x-1)}$$

where A, B, and C are atoms.

At the present time the only excited molecular species known to lase as the result of formation from an exchange or abstraction reaction are HF, HCl, HBr, HI, OH, and CO. The literature discloses, however, that from the infancy of chemical lasers, the reactions of at least certain metal atoms with an appropriate oxidizer have theoretically been considered candidates for production of lasing species in a chemical laser. Polanyi, for example, proposed an alkali metal atom plus halogen or halide as suitable reactions for producing vibrational population inversion and hence lasing in a chemical laser. See, e.g., "Vibrational-Rotational Population Inversion" presented at the Chemical Laser Conference, University of California at San Diego, LaJolla, California, September 9–11, 1964, and published in Applied Optics Supplement on Chemical Lasers, p. 109 (1965). To date, however, the literature reveals no operative metal atom-oxidizer chemical laser system.

SUMMARY OF THE INVENTION

We have found that by producing copious quantities of metal or carbon atoms in a reaction vessel containing a gaseous oxidizer and placed within an optical resonant cavity, chemical lasing may readily be achieved. The lasing species are molecular in nature and are readily produced by exchange or other abstraction reactions between the metal or carbon atoms and the oxidizer. The molecular species may be metal or carbon halides or oxides. Metals and oxidizers which will form lasing molecular species are limited only by the requirements that (1) the particular reaction forming the species be exothermic, and (2) the exothermicity be deposited in the molecular species sufficiently and with a distribution to produce a population inversion in the vibrational levels leading to optical gain in the system. Any metal-oxidizer combination which meets these constraints is within the purview of this invention. Various metals may be atomized within the reaction vessel by any of the following techniques: (a) exploding wire, (b) imploding film, (c) explosively driven jets, (d) rapid decomposition of gaseous organometallics and/or metal azides, (e) laser evaporation. Carbon atoms may be obtained by electrically exploding a graphite smear.

In one embodiment, carbon and various metals are atomized in an atmosphere of gaseous fluorine. In this embodiment, the following lasing species have been produced: AlF, MgF, LiF, TiF, AuF, PtF, NiF, UF, FeF, CuF, VF, ZnF, ZrF, MoF, AgF, TaF, WF, and CF. In another embodiment employing the use of gaseous oxygen, the lasing species TiO, VO, ZrO, MoO, TaO, WO, UO, and CO have been formed. In a third embodiment, lasing results from exploding a Ti wire in $NF_3$ oxidizer gas. In a fourth embodiment, exploding a U wire in chlorine gas produces the lasing species of UCl.

BRIEF DESCRIPTION OF THE DRAWINGS

FIG. 1 is a diagrammatic representation of the chemical laser of this invention.

FIG. 2 is a cross-sectional view of the reaction vessel of FIG. 1 which shows exploding wire means for producing metal atoms.

FIG. 3 is a cross-sectional view of the reaction vessel of FIG. 1 which shows imploding film means for producing metal atoms.

FIG. 4 is a cross-sectional view of the reaction vessel of FIG. 1 which shows means for producing carbon atoms.

DESCRIPTION OF THE PREFERRED EMBODIMENT

Figure 5:
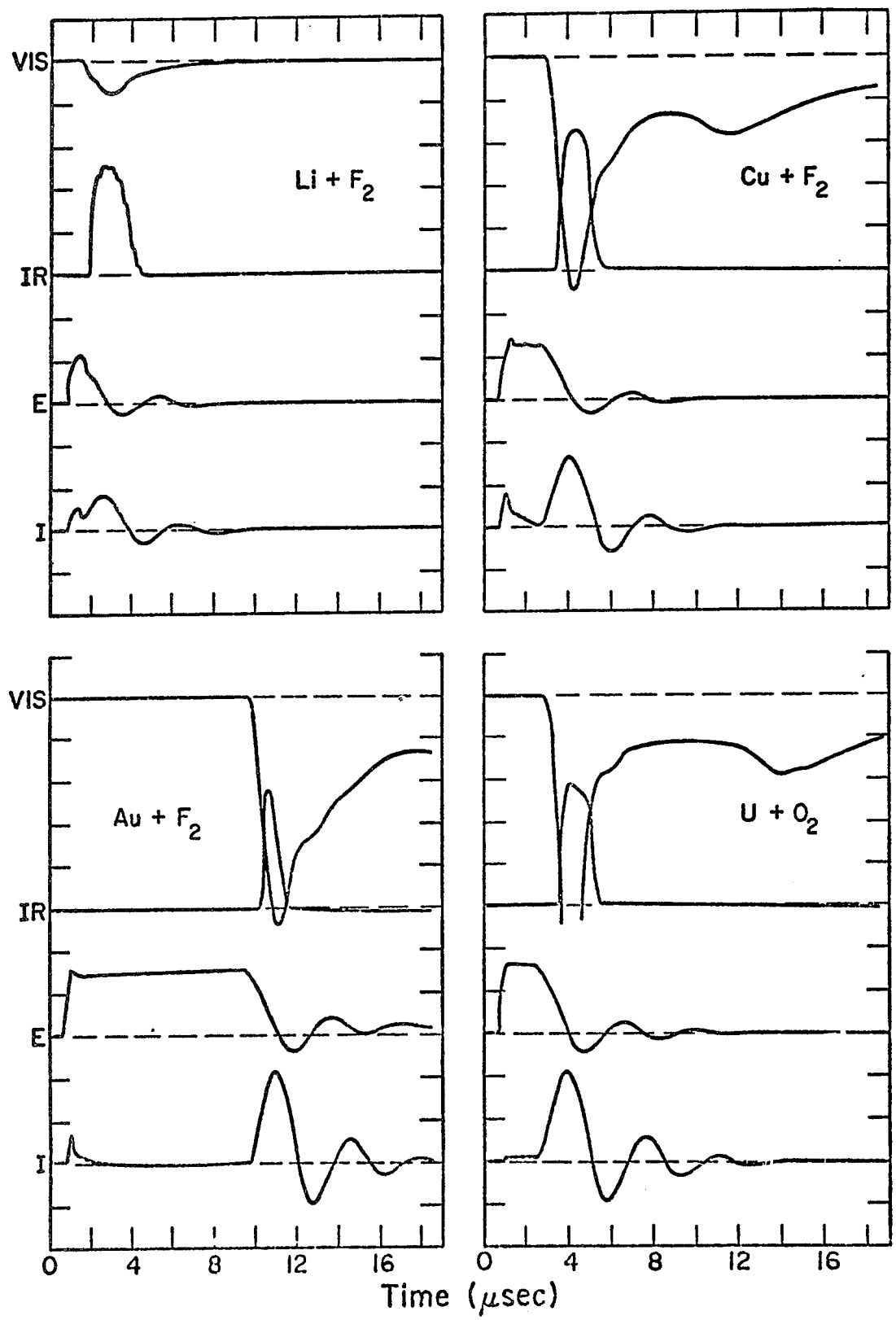
FIG. 5 shows comparative oscillograms of visible fluorescence (VIS), infrared lasing (IR), voltage (E) at 15 kV/div, and current (I) at 5 kA/div (except Li at 10 kA/div) produced by exploding wires in oxidizing gases. On visible fluorescence, negative deflection corresponds to increasing intensity.
Figure 6:
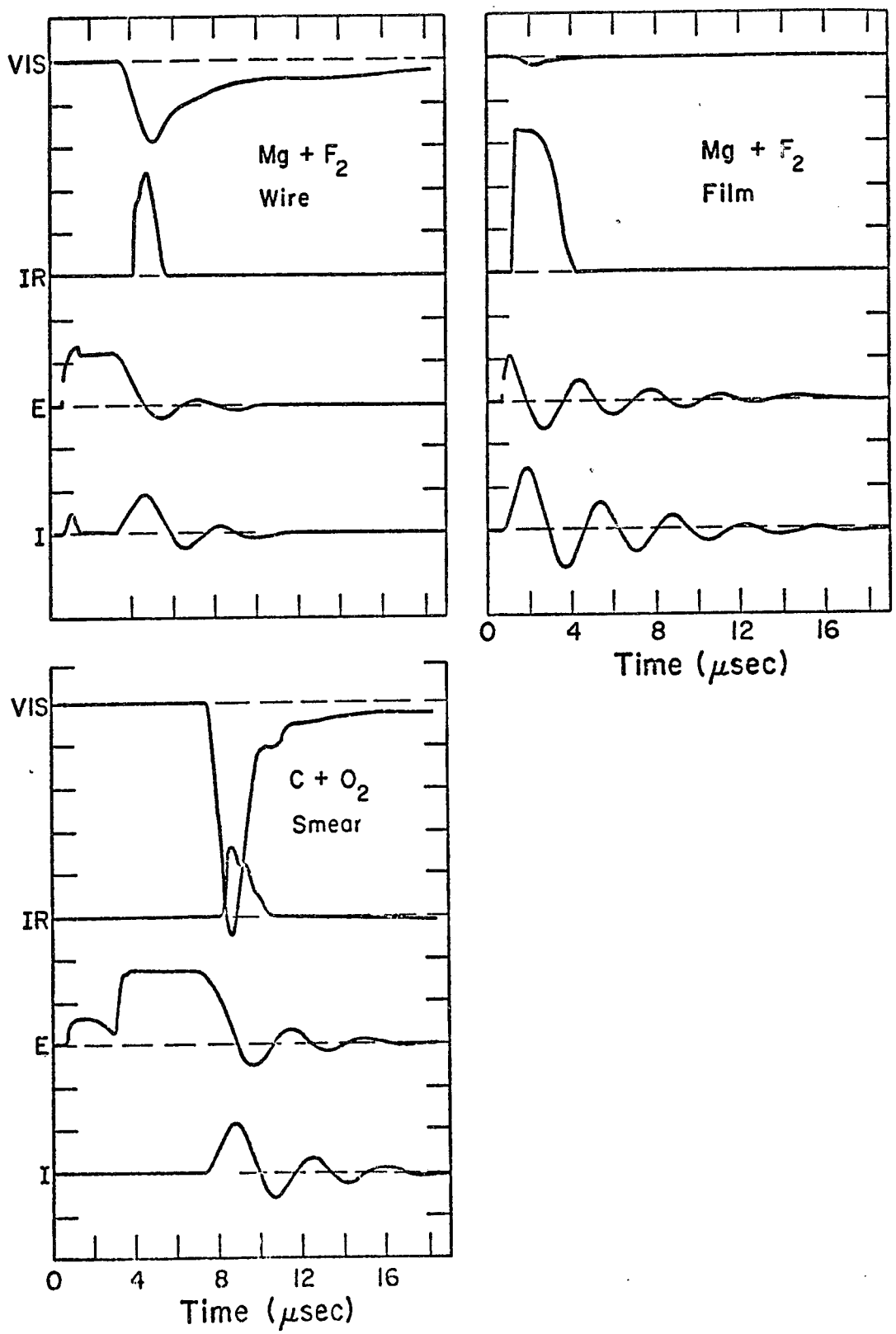
FIG. 6 shows comparative oscillograms of visible fluorescence (VIS), infrared lasing (IR), voltage (E) at 15 kV/div, and current (I) at 10 kA/div for three techniques of atomization used in the apparatus of FIG. 1. On visible fluorescence, negative deflection corresponds to increasing intensity.

One embodiment of the chemical laser of this invention is shown in FIGS. 1 and 2. An optical resonant cavity is formed by mirrors 7,7'. Reaction vessel 6 containing an appropriate gaseous oxidizer supplied from oxidizer supply 2 is aligned along the optical axis of the cavity. At either end of reaction vessel 6 are housings 3,3' containing baffles 20,20' which protect optical windows 4,4' from the explosive effects of the reaction in vessel 6. Housings 3,3' are mounted to reaction vessel 6 by means of end plates 21,21' having aligned openings 25,25' centered therein. Safety vessel 5 surrounds reaction vessel 6. The purpose of vessel 5 is to protect against atmospheric contamination by the oxidizer within reaction vessel 6 in the event that vessel 6 should fail during operation of the laser. Sleeves 19,19' are provided so that the portions of the optical resonant cavity between windows 4,4' and mirrors 7,7' may be purged with an appropriate gas if desired. For diagnostic purposes, mirror 7' is provided with a small opening 8 whereby a beam 9 of laser light is allowed to pass through beam splitter 10. Split beams 9', 9'' in turn are reflected from mirrors 11,12 through filters 13,14 into detectors 15,16, respectively. Visible fluorescence 18 from reaction vessel 6 is measured by means of detector 17.

Various means may be used to produce large amounts of metal or carbon atoms within reaction vessel 6. As shown in FIG. 2, a wire 23 of a desired metal may be passed through vessel 6 and attached to mounts 24,24' on end plates 21,21'. End plates 21,21' which are made of a conductive material are attached by means of electrical leads 22,22' to housings 3,3' which are also conductive. Housings 3,3' are in turn attached to a power supply 1. When a sufficient current is passed through the circuit thus established, wire 23 explodes, thus producing copious quantities of metal atoms which react with the oxidizer in vessel 6 to produce a lasing reaction and, thus, optical gain. Alternatively, as shown in FIG. 3, a metal film 26 may be deposited or otherwise placed against the inner surface of reaction vessel 6. As long as film 26 makes good electrical contact with end plates 21,21', passage of sufficient current through the resulting circuit from power supply 1 causes film 26 to implode, forming metal atoms in quantity which mix with the oxidizer in reaction vessel 6 and produce a lasing reaction and, thus, optical gain. A means by which carbon atoms can be readily produced in reaction vessel 6 is shown in FIG. 4. A glass rod 28 having a roughened surface is coated with graphite 27 and inserted into reaction vessel 6. The coating may be readily accomplished by rubbing the rod with a soft graphite. A good electrical connection is established between end plates 21,21' and graphite 27 by means of wire leads 29,29'. When sufficient current from power supply 1 is passed through the resulting circuit, graphite coating explodes from rod 28 and produces a lasing reaction with the oxidizer in vessel 6.

Other means may also be used to produce the requisite metal or carbon atoms in the reaction vessel. For example, organometallic compounds or metal azides may be rapidly decomposed in the reaction vessel. Such decomposition is easily brought about through use of electrical or light energy. Further, for very large systems, appropriate metal jets may be produced through detonation of a high explosive shaped charge having a hollow conical liner of the desired metal. Such techniques are well known in the explosives art. See, e.g., Wescott et al., 77 J. Geophysical Res. 2982 (1972). Finally, metal vapor plumes may be formed by laser energy deposition.

In the apparatus shown in FIGS. 1 through 4, the metal-oxidizer combinations given in the Table readily produced lasing reactions. To produce the lasing reactions, the apparatus had the following geometry and components. Reaction vessel 6 was a glass tube 23.8 cm long and with a 22 mm inside diameter. Housings 3,3' and end plates 21,21' were made of stainless steel. Optical windows 4,4' were made of KBr and aligned at the Brewster angle. Mirrors 7,7' had a 10-m radii of curvature, were gold plated, and were spaced 144 cm apart. Reaction vessel 6 was centered between mirrors 7,7'. Mirror 7' had a 2 mm diameter hole 8 through its center for output coupling. Beam splitter 10 consisted of a KRS-5 (TlBr) flat. The transmitted portion 9'' of the beam was focused by a spherical mirror 12 through filters 13 to an infrared HgCdTe photoconductive detector 16 having a peak response at 16.2 $\mu$. The reflected portion 9' of the beam was directed onto a focusing mirror 11 and then through filters 14 to an infrared PbSnTe photovoltaic detector 15 having a peak response at 11 $\mu$. In some instances, a Ge:Au detector having a peak response at 5 $\mu$ was substituted for the PbSnTe detector. The visible fluorescence 18 was monitored through the side of reaction vessel 6 and safety vessel 5 (also of glass) with a vacuum photodiode 17.

Table

METAL ATOM OXIDATION LASERS

| Metal | Oxidizer | Pressure (torr) | Laser Onset Time ($\mu$sec) | Laser Duration ($\mu$sec) | Laser Wavelength (microns) | | | $-\Delta H°_{298}$ (kcal/mole) |
|---|---|---|---|---|---|---|---|---|
| Li | $F_2$ | 25.6 | 2.0 | 2.6 | 16 | $> \gamma >$ | 13 | 101.0 |
| C[a] | $F_2$ | 41.6 | 8 | 2.0 | 24 | $> \gamma >$ | 10.5 | 91.0 |
| C[a] | $O_2$ | 71.8 | 8.4 | 2.0 | 24 | $> \gamma >$ | 5 | 137.8 |
| Mg | $F_2$ | 28.2 | 4.2 | 1.5 | 13.5 | $> \gamma >$ | 12.8 | 69.5 |
| Mg[b] | $F_2$ | 30.1 | 1.3 | 2.8 | 14 | $> \gamma >$ | 12.8 | 69.5 |
| Al[b] | $F_2$ | 31.7 | 1.5 | 1.4 | 14 | $> \gamma >$ | 8.8 | 122.5 |
| Al[c] | $F_2$ | 24.6 | 3.0 | 1.7 | 13.5 | $> \gamma >$ | 12.5 | 122.5 |
| Ti | $F_2$ | 24.8 | 3.8 | 1.6 | 24 | $> \gamma >$ | 11.1 | 110.1 |
| Ti | $NF_3$ | 26.2 | 4.9 | 1.7 | 24 | $> \gamma >$ | 5 | 87.5 |
| Ti | $O_2$ | 65.5 | 5.7 | 1.4 | 24 | $> \gamma >$ | 10.5 | 49.7 |
| V | $O_2$ | 55.8 | 5.3 | 1.0 | 14 | $> \gamma >$ | 8.8 | 28 |
| V | $F_2$ | 59.0 | 4.0 | 1.7 | 14 | $> \gamma >$ | 8.8 | 90 |
| Fe | $F_2$ | 28.4 | 4.2 | 2.2 | 24 | $> \gamma >$ | 11.1 | 69.2 |
| Ni | $F_2$ | 25.8 | 3.4 | 2.2 | 24 | $> \gamma >$ | 10.5 | 66.[d] |
| Cu[b] | $F_2$ | 35.6 | 4.3 | 0.4 | 14 | $> \gamma >$ | 8.8 | 50.1 |

3,916,338

Table-Continued

METAL ATOM OXIDATION LASERS

| Metal | Oxidizer | Pressure (torr) | Laser Onset Time ($\mu$sec) | Laser Duration ($\mu$sec) | Laser Wavelength (microns) | | | $-\Delta H°_{298}$ (kcal/mole) |
|---|---|---|---|---|---|---|---|---|
| Cu | $F_2$ | 26.7 | 3.5 | 2.1 | 24 | $> \gamma >$ | 11.1 | 50.1 |
| Zn | $F_2$ | 34.2 | 6.3 | 0.9 | 14 | $> \gamma >$ | 8.8 | 49. |
| Zr | $O_2$ | 58.9 | 4.8 | 1.3 | 14 | $> \gamma >$ | 8.8 | 75. |
| Zr | $F_2$ | 65.7 | 2.3 | 2.4 | 14 | $> \gamma >$ | 8.8 | 110. |
| Mo | $O_2$ | 61.5 | 4.3 | 1.2 | 14 | $> \gamma >$ | 8.8 | 5. |
| Mo | $F_2$ | 61.9 | 3.4 | 2.3 | 16 | $> \gamma >$ | 8.8 | 82. |
| Ag | $F_2$ | 79.8 | 2.4 | 1.0 | 14 | $> \gamma >$ | 8.8 | 46. |
| Ta | $O_2$ | 60.6 | 4.4 | 1.0 | 14 | $> \gamma >$ | 8.8 | 78. |
| Ta | $F_2$ | 31.8 | 4.5 | 1.8 | 14 | $> \gamma >$ | 8.8 | 107. |
| W | $O_2$ | 60.1 | 4.3 | 1.3 | 14 | $> \gamma >$ | 8.8 | 42. |
| W | $F_2$ | 37.2 | 3.1 | 2.6 | 14 | $> \gamma >$ | 8.8 | 92. |
| Pt | $F_2$ | 28.1 | 3.6 | 2.4 | 24 | $> \gamma >$ | 11.1 | — |
| Au | $F_2$ | 28.6 | 10.4 | 1.3 | 24 | $> \gamma >$ | 10.5 | 35.[d] |
| Pb | $F_2$ | 67.9 | 3.8 | 2.0 | 30 | $> \gamma >$ | 8.8 | 37. |
| U | $F_2$ | 30.5 | 3.7 | 3.0 | 24 | $> \gamma >$ | 10.5 | 126.[e] |
| U | $Cl_2$ | 41.8 | 5.8 | 2.0 | 30 | $> \gamma >$ | 14 | 89. |
| U | $O_2$ | 51.7 | 3.6 | 1.9 | 16 | $> \gamma >$ | 8.8 | 60.2[f] |

[a] Atoms produced by smear technique, i.e., graphite rubbed on a glass rod, and then exploded by electrical energy.
[b] Atoms produced by imploding film technique
[c] Atoms produced from two wires rather than one.
[d] Calculated from estimated data in R. C. Feber, Los Alamos Scientific Laboratory Report LA-3164 (1964).
[e] Calcuted from estimated data by I. N. Godnev and A. S. Sverdlin, Tzv. Vysshikh, Uchebn, Zavendenii, Khim, i Khim. Tekhnol, 9 (1) 40 (1966).
[f] G. DeMaria, R. P. Burns, J. Drowart, and M. G. Inghram, J. Chem. Phys. 32 1373 (1960).

Before operation of the system, the volumes within sleeves 19,19' were purged with $N_2$ gas. Before the metal sought to be atomized was installed in reaction vessel 6, the vessel was aligned within the optical resonant cavity by flowing a gas mixture of 70% He, 20% $N_2$, and 10% $CO_2$ through it, pulsing an electrical discharge between end plates 21,21' and optimizing the resulting $CO_2$ laser output.

Except where otherwise indicated in the Table, all metals were initially present in reaction vessel 6 as a fine wire 23 mounted between end plates 21,21'. Each wire 23 was 23.8 cm long and wires of the various metals had the following diameters: Pb, 0.193 mm; Li, 0.200 mm; Mg, Ta, and Fe, 0.127 mm; Al, 0.132 mm; Ti, 0.041 mm; Ni and V, 0.051 mm; Cu, 0.080 mm; Pt, Zn, Zr, W, and Au, 0.076 mm; Ag and Mo, 0.025 mm; U with $F_2$, 0.127 mm; U with Cl, 0.076 mm; and U with $O_2$, 0.066 mm. The Mg, Al, and Cu films were prepared by exploding wires onto the inner surface of reaction vessel 6 at less than $10^{-5}$ torr pressure. The carbon smears were prepared by rubbing graphite onto 3 mm grit blasted glass rods. With single wires, power supply 1 was operated at 20 kV with a 0.48 $\mu$F capacitor.

Figure 8:
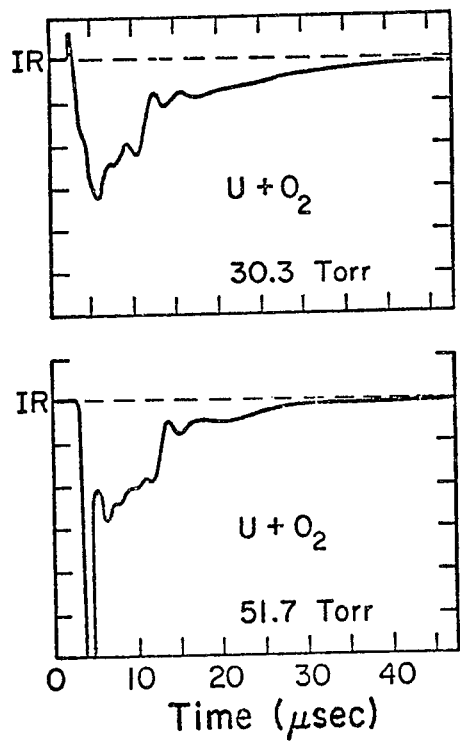
FIG. 8 is a comparison of oscillograms showing the effect of oxidizer pressure on the laser threshold for U wire exploding into $O_2$.

The oxidizer pressures at which lasing occurs are not limited to those shown by example in the Table. It will be readily apparent that there is some pressure below which lasing does not occur. Further, it is apparent that this pressure is dependent on the type of oxidizer, the metal, and the geometry of the laser cavity. In the laser cavity used to obtain the data of the Table, the lowest pressure of $F_2$ at which lasing begins appears to be in the range of 10–12 torr depending upon the metal. For the oxidizer $NF_3$, the pressure at which lasing begins appears somewhat higher, being probably in the vicinity of 15 torr. For $O_2$, the required pressure appears substantially higher, as shown by the oscilloscope traces of FIG. 8. In FIG. 8, the upper trace, made at an $O_2$ pressure of 30.3 torr, shows only fluorescence with no onset of lasing, whereas the lower trace, made with an $O_2$ pressure of 51.7 torr, shows definite lasing.

Again, depending on the type of oxidizer, the metal, and the geometry of the laser cavity, there will be some upper pressure limit at which lasing ceases or is at least severely degraded. The exact pressure range over which a particular metal-oxidizer combination lases in a particular geometry may readily be established by simple experimentation. With an oxidizer such as $F_2$, this range may be quite wide. For example, Al wires exploding into $F_2$ at pressures of 12.7 to 251.1 torr produced intense pulses of infrared radiation, i.e., lasing within a few microseconds after the power supply was triggered. Pulse duration and laser onset time both increased with increasing pressure over this pressure range. This is clearly indicative that this metal-oxidizer combination will continue to lase at much higher pressures of the oxidizers. Titanium wires exploded into $F_2$ over the pressure range of 25 to 230 torr produced very similar results. The fastest changes occurred with respect to the pressure range of 25 to 75 torr; thereafter changes were much more gradual. The output differences between 100 and 200 torr were so small as to indicate that this laser is likely to function at $F_2$ pressures as high as one atmosphere. As a practical matter, however, it appears that little is gained by operating at $F_2$ pressures above about 75 torr.

Figure 7:
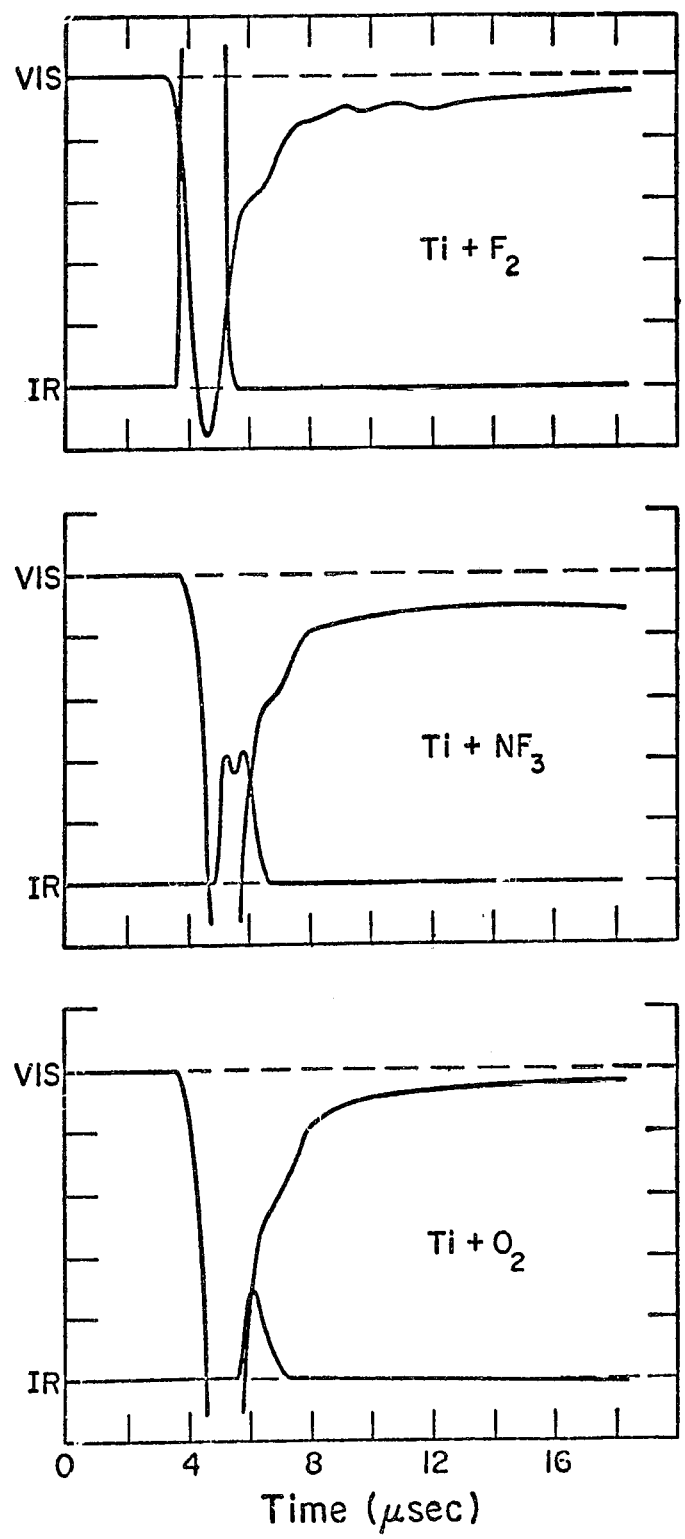
FIG. 7 shows oscillograms of visible fluorescence (VIS) and infrared lasing (IR) for an exploding Ti wire in three oxidizing gases. On visible fluorescence, negative deflection corresponds to increasing intensity.

The lasing species is thought to be a diatomic molecule formed between an atom of the metal or carbon and an atom of the oxidizer, but the invention is not to be so limited. The heats of formation given in the Table are therefore those for the monofluoride or monoxide. Except where otherwise indicated, the heats of reaction are calculated from D. R. Stull and H. Prophet, JANAF Thermochemical Tables, National Bureau of Standards, Washington, DC (2d ed., 1971). The metal-oxidizer combination which will produce lasing molecular species are not limited to those shown by example in the Table. It is apparent that the metals given in the Table range widely over the Periodic Table. See also the oscillograms (IR) indicating lasing in FIG. 5 for the widely disparate metals Li, Cu, Au, and U. Likewise, oxidizers suitable for use in the practice of this invention are not limited to those shown by example in the Table. FIG. 7 makes clear also that various oxidizers will produce lasing with the same metal. Metals and oxidizers which will form lasing molecular species are limited only by the requirements that (1) the particular reaction forming the species be exothermic, and (2) the exothermicity be deposited in the molecular species sufficiently and with a distribution to produce a population inversion in the vibrational levels. Thus, within the context of this application, it will be understood that "highly exothermic" means merely that the energy released by the reaction is sufficient to populate the first or higher vibrational levels of the lasing product molecule. It will of course be understood that for an operational laser system the geometry of the laser cavity must be such that laser gain in the cavity is greater than losses that occur therein. However, assuming the proper geometry, it is evident from the heat of reaction data in the Table, that very high exothermicities are not required. Thus, for example, the exothermicity of the reaction forming the lasing species AuF is only about 35 kcal/mole, while that of the reaction forming the lasing species VO is about 28 kcal/mole. Finally, the reaction forming the lasing species MoO has an exothermicity of only about 5 kcal/mole. For many metal-oxidizer combinations, the heats of reaction of diatomic molecules are readily available from the JANAF tables. Generally speaking, the heats of reaction of almost all diatomic molecules resulting from metal-oxidizer reactions may be calculated from data presently available in the literature. On the basis of the data in the Table, it may reasonably be expected that any metal-oxidizer combination which produces diatomic molecules in which the heat of reaction is sufficient to dominantly populate vibrational states above the ground state will produce lasing in accordance with the practice of this invention. Thus, in the proper geometry, reactions such as $$Al + NF_3 \rightarrow AlF^* + NF_2 \quad \Delta H = -99.9 \text{ kcal/mole}$$

and $$Al + Cl_2 \rightarrow AlCl^* + Cl \quad \Delta H = -61.4 \text{ kcal/mole}$$

may be expected to produce lasing diatomic molecules.

When the reaction $$M + XY \rightarrow MX^* + Y$$

where MX* is an excited species, is exothermic, M may be virtually any metal for $XY = F_2$, or XY may be almost any gaseous oxidizer for M = a reactive metal. In this regard, when $XY = O_2$, M must be a refractory metal to liberate energy for lasing. Also when XY is $O_2$, the presence of 1 to 10 mole percent of $H_2O$ or $H_2O_2$ serves to catalyze the reaction forming MX*.

Figure 9:
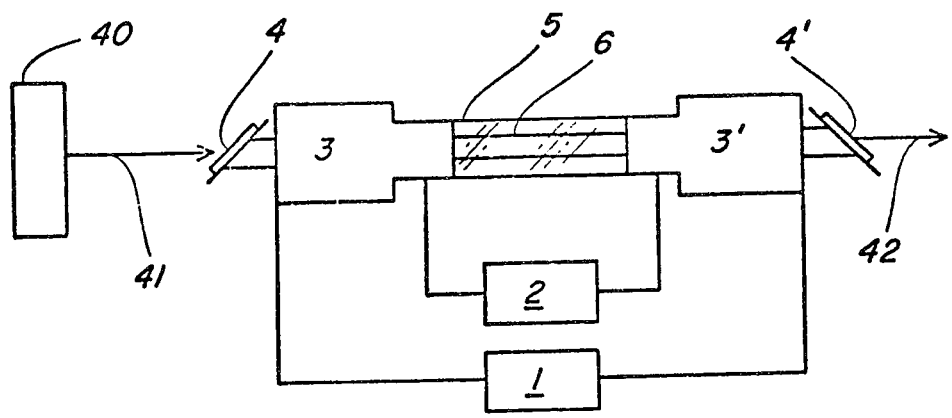
FIG. 9 shows the laser of this invention in an amplifier configuration.

Although this description has thus far been limited to the operation of the laser of this invention in the oscillator configuration, it will be readily apparent that, as shown in FIG. 9, the laser may be adapted to operate as an amplifier. Thus, for example, an oscillator 40 may be used to send a laser beam 41 through reaction vessel 6 at such time as carbon or metal atoms are formed and mixed with the gaseous oxidizer therein. The result will be an amplified beam 42. For use as an amplifier, reaction vessel 6 and housings 3,3' may have the same internal configuration as shown in FIGS. 2 through 4.

What we claim is:

1. A chemical laser which comprises (a) an optical gain region, (b) means for containing a gaseous oxidizer within said gain region, (c) a gaseous oxidizer contained within said cavity, (d) means for forming and mixing copious quantities of metal atoms with said oxidizer to form molecules containing said metal atoms and having a population inversion therein, said metal and said oxidizer being so selected that the reaction of said oxidizer with said metal atoms to form molecules containing said metal atoms is highly exothermic and said oxidizer being at a pressure at which the lasing threshold is exceeded, and (e) means for stimulating a beam of laser radiation in said inverted molecules.

2. The laser of claim 1 wherein said means for stimulating is an optical resonant cavity.

3. The laser of claim 2 wherein said molecules are a metal monohalide.

4. The laser of claim 3 wherein said molecules are a metal monofluoride.

5. The laser of claim 2 wherein said oxidizer is selected from the class consisting of $Cl_2$, $F_2$, $NF_3$, and $O_2$.

6. The laser of claim 5 wherein said oxidizer is $F_2$ and said metal atoms are selected from the class consisting of V, Zn, Zr, Mo, Ag, Ta, and Pb.

7. The laser of claim 5 wherein said oxidizer is $O_2$ and said metal atoms are refractory metal atoms.

8. The laser of claim 7 wherein said oxidizer contains 1 to 10 mole percent of $H_2O$ or $H_2O_2$.

9. The laser of claim 8 wherein said metal atoms are V, Zr, Mo, Ti, Ta, W, or U.

10. The laser of claim 5 wherein said oxidizer is $Cl_2$ and said metal atoms are U.

11. A method of producing molecules having a population inversion therein which comprises forming and reacting copious quantities of metal atoms with a gaseous oxidizer to form molecules containing said metal atoms, said oxidizer and said metal being so selected that the reaction of said oxidizer with said metal atoms to form inverted molecules containing said metal atoms is highly exothermic.

12. The method of claim 11 wherein said oxidizer is selected from the class consisting of $Cl_2$, $F_2$, $NF_3$, and $O_2$.

13. The method of claim 12 wherein said oxidizer is $F_2$ and said metal atoms are selected from the class consisting of V, Zn, Zr, Mo, Ag, Ta, and Pb.

14. The method of claim 12 wherein said oxidizer is $O_2$ and said metal atoms are refractory metal atoms.

15. The method of claim 14 wherein said oxidizer contains 1 to 10 mole percent of $H_2O$ or $H_2O_2$.

16. The method of claim 15 wherein said metal atoms are V, Zr, Mo, Ti, Ta, W, or U.

17. The method of claim 12 wherein said oxidizer is $Cl_2$ and said metal atoms are U.

* * * * *